United States Patent [19]

Arnold

[11] Patent Number: 4,787,679
[45] Date of Patent: Nov. 29, 1988

[54] TWIN WHEEL ASSEMBLY

[76] Inventor: Roderick W. Arnold, 14571 Whitcomb St., Detroit, Mich. 48227

[21] Appl. No.: 84,895

[22] Filed: Aug. 13, 1987

[51] Int. Cl.⁴ .............................................. B60B 11/06
[52] U.S. Cl. ............................. 301/36 R; 301/36 WP; 301/13 SM; 301/9 DN
[58] Field of Search ........... 301/36 R, 36 WP, 9 DN, 301/9 R, 9 AN, 13 R, 13 SM, 105 R

[56] References Cited

U.S. PATENT DOCUMENTS

| | | | |
|---|---|---|---|
| 1,096,721 | 5/1914 | Jamieson | 301/13 R |
| 3,009,742 | 11/1961 | Rabe et al. | 301/36 R |
| 3,061,377 | 10/1962 | Walther | 301/13 SM |
| 3,847,442 | 11/1974 | Masser | 301/13 SM |
| 3,990,747 | 11/1976 | Long | 301/13 SM |

FOREIGN PATENT DOCUMENTS

0619895 10/1980 Switzerland ...................... 301/36 R

*Primary Examiner*—Robert B. Reeves
*Assistant Examiner*—Frank Williams
*Attorney, Agent, or Firm*—Gifford, Groh, Sheridan, Sprinkle and Dolgorukov

[57] ABSTRACT

A twin wheel rim assembly is disclosed for use with an axle having a hub with an outwardly extending lip adjacent its inner end. The entire wheel assembly includes a pair of substantially identical wheels each having a rim with an outwardly flared portion as well as a tubular and cylindrical spacer. The wheels and the spacer are coaxially positioned over the hub so that the outwardly flared circumferential portion of one wheel abuts against the outwardly extending lip of the hub and so that the spacer is sandwiched in between the wheel rims. The wheel spacer is unable to slip because it has affixed to it evenly spaced ribs between each pair of wheel spokes. Both ends of each rib abut between each pair of wheel spokes. The ribs on the inside of the spacer is the primary element which prevents wheel slippage. This element in conjunction with the serrated edges will prevent wheel slippage. Wheel cleats are secured to the hub and each cleat includes a portion which abuts against the outwardly flared circumferential portion of the outer wheel. Consequently, upon tightening of the wheel cleats, the wheel rims and spacer are compressibly secured together and to the axle hub. Each axial end of the spacer, furthermore, is serrated and meshes with a like serrated axial end on each wheel rim to prevent relative rotation between the wheels.

1 Claim, 2 Drawing Sheets

TWIN WHEEL ASSEMBLY

BACKGROUND OF THE INVENTION

I. Field of the Invention

The present invention relates to a twin wheel rim assembly and, more particularly, to a twin wheel rim assembly with means to prevent relative rotation between the wheels, rims, spacer and wheel spoke.

II. Description of the Prior Art

Many trucks utilize twin wheel rim assemblies in order to increase the load carrying capacity for the truck. In each twin wheel rim assembly, two wheels are coaxially secured to a hub at one end of the axle.

In one previously known twin wheel rim assembly, the axle hub includes an outwardly extending lip adjacent its inner end while each wheel of the twin wheel rim assembly includes a rim having an outwardly extending circumferential portion. One wheel rim is then positioned coaxially over the hub so that the outwardly extending lip on the axle hub abuts against the outwardly flared circumferential portion on the wheel rim. A tubular and cylindrical spacer is then positioned over the wheel hub so that it abuts against the outer axial end of the rim for the inner wheel.

The second wheel is then positioned coaxially over the hub so that its inner axial end abuts against the spacer. The outer and inner wheel rims are then secured to the wheel hub by a plurality of wheel cleats. These wheel cleats are conventional in construction and include a portion which engage the outwardly flared circumferential portion of the outer wheel rim. Consequently, once the wheel cleats are tightened against the wheel hub, the wheel cleats compressibly urge the wheel rims together with the spacer sandwiched in between the wheel rims thus securing both wheels to the axle hub.

One disadvantage of these previously known twin wheel assemblies is that the wheel rims may slip relative to each other, the spacer (and the wheel spoke), and thus rotate relative to each other. Such relative rotation, which typically occurs during a severe braking action for the truck, causes undesirable and extensive wear on the wheel rims, spacer and potentially damaging the valve stem, which would lead to tire air loss and down time for the truck.

A further disadvantage of these previously known twin wheel assemblies is that both wheels may rotate relative to the axle hub during, for example, severe braking action of the truck. When this occurs, extensive wear of the wheel rims, spacer and/or hub together with less effective braking action for the vehicle results.

SUMMARY OF THE PRESENT INVENTION

The present invention provides a twin wheel rim assembly which overcomes all of the above mentioned disadvantages of the previously known assemblies.

In brief, the twin wheel rim assembly of the present invention is provided for use with a conventional axle hub of the type having an outwardly extending lip adjacent its inner end. Similarly, each wheel of the twin wheel rim assembly includes the rim having an outwardly extending circumferential portion which is dimensioned so that the inner wheel abuts against the outwardly extending lip of the hub while, as in the previously known twin wheel assemblies, the wheel cleats abut against the outwardly extending circumferential portion on the outer wheel.

Unlike the previously known twin wheel assemblies, however, the present invention includes a modified spacer in which each axial end is serrated. Similarly, one axial end of each wheel rim is serrated which meshes with the serrations on the spacer. Consequently, with the wheels positioned over the axle hub so that the spacer is sandwiched in between the wheel rims, the serrations on the spacer mesh with the serrations on both wheel rims thus locking the wheels together against relative rotation with respect to each other.

In order to prevent relative rotation of both wheels with respect to the wheel hub, the spacer has affixed to it a plurality of ribs protruding radially inwardly from the hub. These ribs are received inbetween spokes of the wheel hub and prevent relative rotation of the spacer with respect to the wheel hub and, consequently, prevent relative rotation of the twin wheel rims with respect to the hub.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
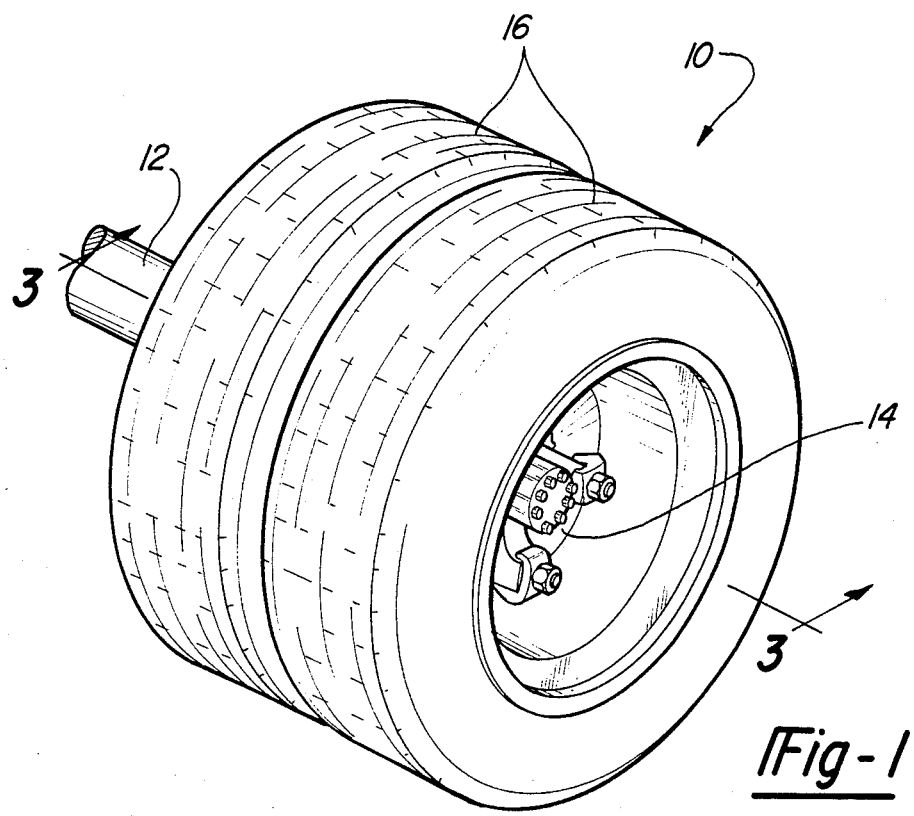
FIG. 1 is a perspective view illustrating a preferred embodiment of the present invention.
Figure 3:
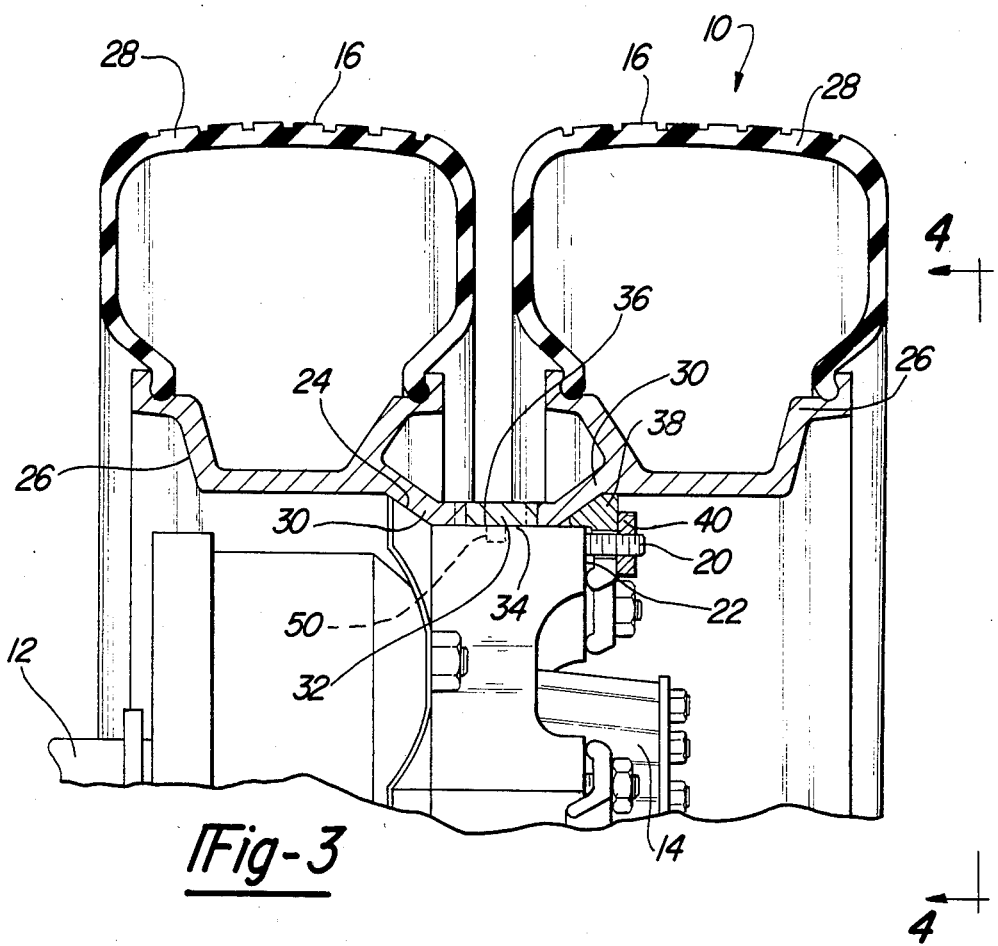
FIG. 3 is a fragmentary cross-sectional view taken substantially along line 3—3 in FIG. 1 and enlarged for clarity.

With reference first to FIGS. 1 and 3, a preferred embodiment of the twin wheel rim assembly 10 of the present invention is thereshown and comprises a wheel axle 12 having a wheel hub 14 at a free end. A pair of substantially identical wheels 16 are coaxially mounted to the hub 14 in a fashion which will be subsequently described in greater detail.

Figure 2:
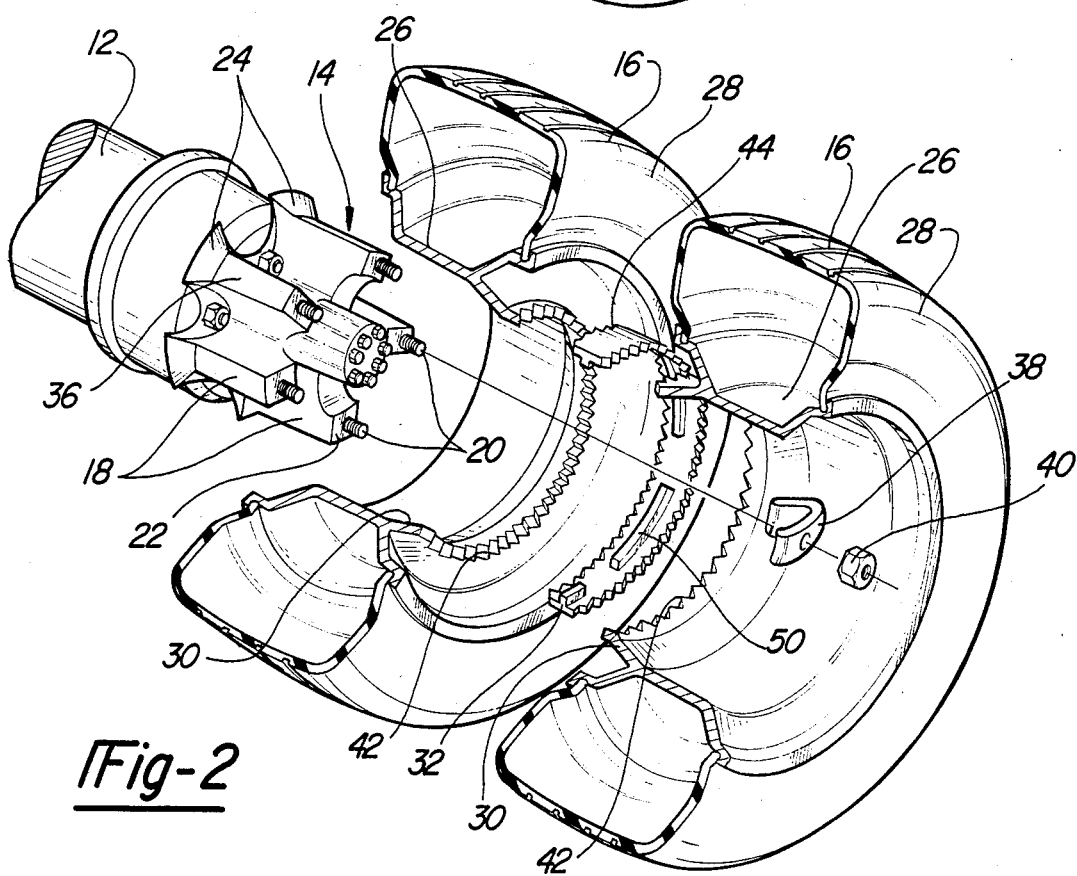
FIG. 2 is a fragmentary exploded view illustrating a preferred embodiment of the present invention.
Figure 4:
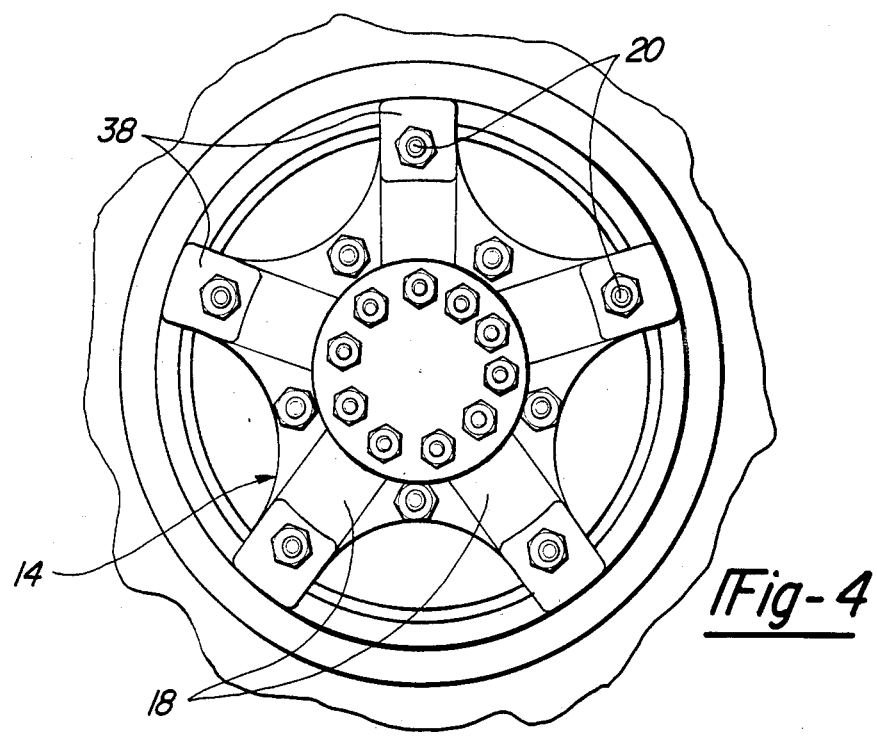
FIG. 4 is a fragmentary view taken substantially along line 4—4 in FIG. 3.

With reference particularly to FIGS. 2 and 4, the wheel hub 14 includes a plurality of circumferentially spaced spokes 18 each having an outwardly extending stud 20 at its outer end 22 (FIG. 2). In the conventional fashion, the hub 14 includes an outwardly extending lip 24 (FIG. 2) adjacent its inner end.

With reference now particularly to FIGS. 2 and 3, the wheels 16 are substantially identical to each other and each includes an inner rim 26 and a tire 28. In the conventional fashion, each rim 26 includes an outwardly flared circumferential portion 30 so that, when the wheels 16 are coaxially positioned over the hub 14 as shown in FIG. 3, the outwardly flared circumferential portion 30 of the inner wheel rim 26 abuts against the lip 24 on the hub 14.

Still referring to FIGS. 2 and 3, as in the previously known twin wheel assemblies, a tubular and cylindrical spacer 32 is coaxially positioned in between the wheel rims 26 so that an inner periphery 34 of the spacer 32 abuts against the outer periphery 36 of each hub spoke 18. Furthermore, as best shown in FIG. 3, a plurality of conventional wheel cleats 38 are secured by bolts 40 to the hub studs 20 so that, upon tightening of the bolts 40, the wheel cleats 38 abut against the outwardly flared circumferential portion on the outer wheel rim 26 and compressibly urge the wheel (rim and tire assembly 26 and 28) together with the spacer 32 sandwiched between the wheel rims 26.

As best shown in FIG. 2, unlike the previously known twin wheel assemblies, one axial end 42 of each wheel rim 26 is serrated so that it has a plurality of outwardly extending V-shaped projections and inwardly extending V-shaped recesses. Similarly, each axial end 44 of the spacer 32 is also serrated so that the serrated axial ends of the spacer 32 flatly mesh with the serrated axial ends 42 of the wheel rims 26. Thus, when the wheel cleats 38 are tightened down to the hub studs 20 by the bolts 40, the serrated ends of the spacer 32 and wheel rims 26 interlock and prevent relative rotation of the wheels 16 with respect to each other.

Still referring to FIGS. 2 and 3, in order to prevent relative rotation between the wheel rims 26 and hub 14, the spacer 32 includes a plurality of circumferentially spaced and radially inwardly extending ribs 50 along its inner surface. These affixed ribs 50 nest in between the spokes 18 of the axle hub 14, best shown in FIG. 3, thus locking the spacer 32 against rotation with respect to the hub 14.

From the foregoing, it can be seen that the present invention provides a twin wheel rim assembly with a simple, but totally effective, means for preventing relative rotation between the wheels with respect to each other and also with respect to the axle hub.

Having described my invention, however, many modifications thereto will become apparent to those skilled in the art to which it pertains without deviation from the spirit of the invention as defined by the scope of the appended claims.

I claim:

1. A twin wheel rim assembly for use with an axle having a hub, said hub having a plurality of circumferentially spaced spokes, said hub having an outwardly extending lip adjacent its inner end, said twin wheel rim assembly comprising:
   a pair of substantially identical wheels, each wheel having a rim with an outwardly flared circumferential portion and a continuously serrated surface on said outwardly flared portion,
   a tubular cylindrical spacer, said spacer having two axial ends and a continuously serrated surface on each axial end, said spacer serrated surfaces being dimensioned to intermesh with said rim serrated surfaces,
   said spacer further comprising a plurality of radially inwardly and circumferentially extending ribs,
   said wheels and said spacer being adapted to be coaxially positioned over said hub so that the outwardly flared circumferential portion of one of said wheels abuts against said outwardly extending lip of the hub and so that said spacer is sandwiched between said rims,
   means attached to said hub for compressibly urging the other wheel rim towards said one wheel so that said serrated surfaces on said hubs and said spacer intermesh and prevent relative rotation between said wheel rims and
   wherein said ribs are dimensioned so that each of said ribs extends entirely between two adjacent spokes on said hub.

* * * * *